United States Patent
Wong et al.

(10) Patent No.: US 11,719,719 B2
(45) Date of Patent: Aug. 8, 2023

(54) METROLOGY PROBE WITH BUILT-IN ANGLE AND METHOD OF FABRICATION THEREOF

(71) Applicant: Bruker Nano, Inc., Santa Barbara, CA (US)

(72) Inventors: Jeffrey Wong, Simi Valley, CA (US); Joseph Fragala, Camarillo, CA (US); Weijie Wang, Thousand Oaks, CA (US); Deepkishore Mukhopadhyay, Ventura, CA (US); Xing Zhao, Camarillo, CA (US); Rakesh Poddar, Camarillo, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 5 days.

(21) Appl. No.: 17/348,877

(22) Filed: Jun. 16, 2021

(65) Prior Publication Data
US 2022/0404392 A1    Dec. 22, 2022

(51) Int. Cl.
*G01Q 60/38* (2010.01)
*G01Q 70/10* (2010.01)
*G01Q 70/16* (2010.01)

(52) U.S. Cl.
CPC ............ *G01Q 60/38* (2013.01); *G01Q 70/10* (2013.01); *G01Q 70/16* (2013.01)

(58) Field of Classification Search
CPC ......... G01Q 60/38; G01Q 70/10; G01Q 70/16
See application file for complete search history.

(56) References Cited

U.S. PATENT DOCUMENTS

| | | | | |
|---|---|---|---|---|
| 5,992,225 A | * | 11/1999 | Shirakawabe | B81C 1/0015 73/105 |
| 6,458,206 B1 | * | 10/2002 | Givargizov | C30B 29/62 117/921 |
| 2003/0182993 A1 | * | 10/2003 | Hantschel | G01Q 70/16 850/53 |
| 2009/0241233 A1 | * | 9/2009 | Sulzbach | B82Y 35/00 850/40 |
| 2012/0060244 A1 | | 3/2012 | Poddar et al. | |
| 2014/0366230 A1 | | 12/2014 | Wang et al. | |
| 2016/0124014 A1 | | 5/2016 | King et al. | |
| 2020/0348336 A1 | | 11/2020 | Vettori | |

* cited by examiner

*Primary Examiner* — Eliza W Osenbaugh-Stewart
(74) *Attorney, Agent, or Firm* — Boyle Fredrickson S.C.

(57) ABSTRACT

A method of batch-fabricating an array of probe devices for a surface analysis instrument, such as an atomic force microscope (AFM), includes providing a wafer, and photolithographically forming a base and a cantilever for each probe. The cantilever includes a built-in angle, $\theta$, relative to the base, and the base is substantially parallel to a sample holder when the probe device is mounted in a probe holder of the surface analysis instrument.

18 Claims, 6 Drawing Sheets

FIG. 7

# METROLOGY PROBE WITH BUILT-IN ANGLE AND METHOD OF FABRICATION THEREOF

BACKGROUND OF THE INVENTION

Field of the Invention

The preferred embodiments are directed to a probe device for a metrology instrument and a corresponding method of manufacture, and more particularly, an atomic force microscope (AFM) probe device that includes a cantilever having a built-in angle to accommodate optical deflection detection systems of the AFM.

Description of Related Art

Scanning probe microscopes (SPMs), such as the atomic force microscope (AFM), are devices which use a sharp tip and low forces to characterize the surface of a sample down to atomic dimensions. Generally, the tip of the SPM probe is introduced to the sample surface to detect characteristics of the sample. By providing relative scanning movement between the tip and the sample, surface characteristic data can be acquired over a particular region of the sample and a corresponding map of the sample can be generated.

AFMs typically employ probes that are flat or some small unintentional angle, with a cantilever extending from a base, and the cantilever and the surface of the base from which it extends being substantially in the same plane. The tip resides about the distal end of the cantilever and most often extends orthogonally from the plane of the cantilever.

An overview of AFM and its operation follows. A typical AFM system is shown schematically in FIG. 1. An AFM 10 employing a probe device 12 including a probe 14 having a cantilever 15. Scanner 24 generates relative motion between the probe 14 and sample 22 while the probe-sample interaction is measured. In this way images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes, for example, a piezoelectric tube actuator. Alternatively, the scanner may be an assembly of multiple separate actuators. Some AFMs separate the scanner into multiple components, for example an XY scanner that moves the sample and a separate Z-actuator that moves the probe. The instrument is thus capable of creating relative motion between the probe and the sample while measuring the topography or some other surface property of the sample as described, e.g., in Hansma et al. U.S. Pat. No. RE 34,489; Elings et al. U.S. Pat. No. 5,266,801; and Elings et al. U.S. Pat. No. 5,412,980.

Figure 1:
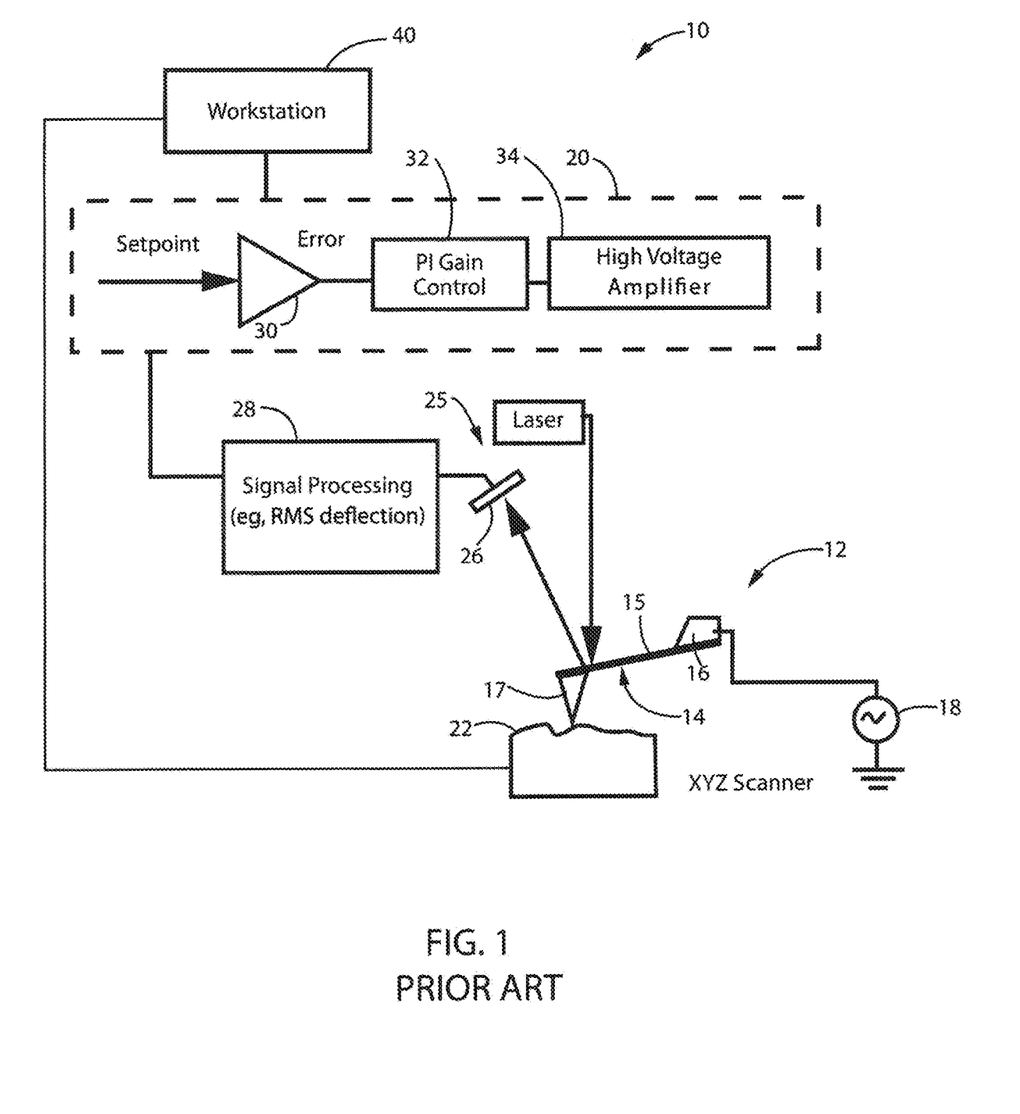
FIG. 1 is a schematic illustration of a Prior Art surface analysis instrument such as an atomic force microscope (AFM)

In a common configuration, probe 14 is often coupled to an actuator or drive 16 that is used to oscillate probe 14 at or near a resonant frequency of cantilever 15. Alternative arrangements measure the deflection, torsion, or other motion of cantilever 15. Probe 14 is often a microfabricated cantilever with an integrated tip 17.

Commonly, an electronic signal is applied from an AC signal source 18 under control of an SPM controller 20 to cause actuator 16 (or alternatively scanner 24) to drive the probe 14 to oscillate. The probe-sample interaction is typically controlled via feedback by controller 20. Notably, the actuator 16 may be coupled to the scanner 24 and probe 14 but may be formed integrally with the cantilever 15 of probe 14 as part of a self-actuated cantilever/probe.

Often a selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26. As the beam translates across detector 26, appropriate signals are processed at block 28 to, for example, determine RMS deflection and transmit the same to controller 20, which processes the signals to determine changes in the oscillation of probe 14. In general, controller 20 generates control signals to maintain a relative constant interaction between the tip and sample (or deflection of the lever 15), typically to maintain a setpoint characteristic of the oscillation of probe 14. More particularly, controller 20 may include a PI Gain Control block 32 and a High Voltage Amplifier 34 that condition an error signal obtained by comparing, with circuit 30, a signal corresponding to probe deflection caused by tip-sample interaction with a setpoint. For example, controller 20 is often used to maintain the oscillation amplitude at a setpoint value, AS, to insure a generally constant force between the tip and sample. Alternatively, a setpoint phase or frequency may be used.

A workstation 40 is also provided, in the controller 20 and/or in a separate controller or system of connected or stand-alone controllers, that receives the collected data from the controller and manipulates the data obtained during scanning to perform point selection, curve fitting, and distance determining operations.

The optical sensing/detecting systems of AFM tools use a laser to bounce off a probe's cantilever and onto a sensor that detects, e.g., sub-nanoscale displacements. The laser source and the sensor are located a certain distance apart from each other, which makes it necessary for the laser to deflect off the cantilever at a known angle in order to be detected by the sensor. The traditional approach is to machine-in the known angle into the probe's mounting fixture, i.e., probe holder. This is illustrated schematically in FIG. 2.

Figure 2:
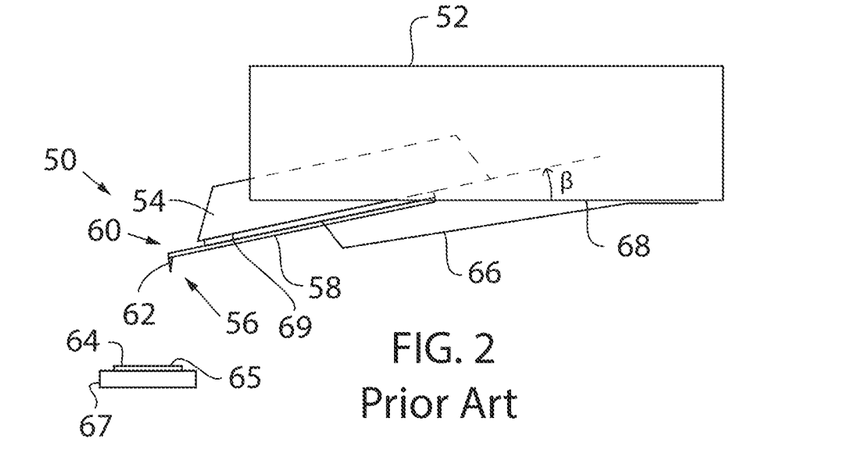
FIG. 2 is a schematic side elevational view of a Prior Art probe fabricated in conventional fashion mounted in a probe holder, the probe holder manufactured with an angle so as to allow the tip of the probe to extend orthogonally to the sample surface during AFM operation.

FIG. 2 shows a probe device 50 mounted in an AFM head/probe holder 52. Probe device 50 includes a base 54 with a probe 56 extending therefrom, in line with a bottom surface 69 of base 54. Probe 56 includes a cantilever 58 having a distal end 60 supporting a tip 62 that interacts with a surface 65 of a sample 64 supported by a sample holder 67 during AFM operation. As noted, AFM head 52 or a portion thereof (e.g., a probe holder) is configured to accommodate probe device 50 so that the device extends from probe holder 52 at an angle thereby positioning tip 62 of probe 56 so it extends generally orthogonally to the sample surface 65. Probe assembly 50 is held in head 52 with, for example, a spring loaded clip 66.

As described above, the sensing systems of AFM tools use a laser that is directed toward and bounces off of a probe's cantilever, and on to a sensor that detects minute displacements. The laser source and the sensor are located a certain distance apart from each other in the AFM head, which makes it necessary for the laser to deflect off the cantilever at an angle in order to be detected by the sensor. The traditional approach is to machine-in the known angle into the probe's mounting fixture. A drawback of this traditional approach is any X-Y offset of the probe in the mount translates directly to a shift in Z between the probe tip and sample. Moreover, force/mass balance of the probe in the angled mount is not ideal and leads to capturing sub-optimal images. This reduction in image quality can be most readily observed in high speed z-actuation of the probe resulting from tracking sample topography, or in vertical actuation of the probe in sub-resonant imaging modes (e.g., Peak Force Tapping), where the asymmetry of the tip mass, relative to the Z direction, on the angled tip mount excites undesirable parasitic motions in the z-scanner. Also, AFM users must account for tip position to ensure that it extends substantially orthogonally to the sample surface at tip-sample engage.

In view of the above, the field of atomic force microscopy was in need of a probe that overcomes the above-noted drawbacks related to proper probe position for maintaining the integrity of the tip-sample relationship. More particularly, a probe designed to avoid the reliance of the probe mount to accommodate proper probe position would be ideal. A method of batch fabrication of such probes was also desired.

Note that "SPM" and the acronyms for the specific types of SPM's, may be used herein to refer to either the microscope apparatus, or the associated technique, e.g., "atomic force microscopy."

SUMMARY OF THE INVENTION

The preferred embodiments overcome the drawbacks of prior solutions by providing a probe with a built-in angle, as well as a corresponding method of manufacture that provides a user experience that is very repeatable and consistent from probe-to-probe. Moreover, using the disclosed design referenced here, the bulk of the tip mass is distributed in a plane orthogonal to Z motion, thereby reducing the effects of parasitic motions helping to preserve image quality. The fabrication of a designed cantilever angle as discussed herein can be applied to nearly all AFM probe products. Since this process allows for batch fabrication, cost to manufacture is very similar to the cost of existing products and results in high yields.

According to a first aspect of the preferred embodiment, a method of batch-fabricating probe devices for a surface analysis instrument includes providing a wafer and photolithographically forming a base and a cantilever for each probe. The cantilever includes a built-in angle, θ, relative to the base. The base is substantially parallel to a sample holder when the probe is mounted in a probe holder of the surface analysis instrument.

In another aspect, the providing step includes bonding an off-axis wafer (111) with a substrate wafer. The method next includes reducing the thickness of the off-axis wafer by grinding and polishing.

In a further aspect of this embodiment, the method includes etching the off-axis wafer to leave a portion of the off-axis wafer having an angled surface relative to the substrate wafer for each probe, and the angle, θ, is 8°-15°. Preferably, the angle is about 12°. The etching step uses a KOH etch for a selected amount of time.

According to a still further aspect of this preferred embodiment, the method includes depositing a silicon nitride layer on the wafer and photolithographically patterning the backside of the wafer. The backside of the wafer is etched with a KOH etch to release the same and then the method includes stripping the silicon nitride layer According to another embodiment, a probe device for a surface analysis instrument including a probe holder includes a base and a cantilever. When the probe assembly is mounted in the surface analysis instrument, at an angle, β, between the base and the probe holder of the surface analysis instrument that is 0°.

The probe assembly further includes a tip. The cantilever extends from the base at an angle, θ, thereto, so that when introduced to a sample, the tip extends in a direction substantially orthogonally to a surface of the sample. The angle, θ, is 8°-15°, and more preferably about 12°.

In another probe embodiment, an AFM probe microfabricated by a process including the steps of providing a wafer and photolithographically forming a base and a cantilever for each probe. As a result of this process, the cantilever includes a built-in angle, θ, relative to the base.

In a further aspect of this embodiment, the base is substantially parallel to a sample holder when the probe is mounted in a probe holder of the AFM, and wherein the angle, θ, is 8°-15°. Moreover, the providing step of the process includes bonding an off-axis wafer with a substrate wafer.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Referring again to FIG. 2, probe device 50 for use in a surface analysis instrument such as an atomic force microscope (AFM) and fabricated in conventional fashion must be mounted in the AFM head/probe holder 52 at an angle β, between a bottom surface 69 of base 54 of probe device and a bottom surface 68 of the AFM/probe holder. In this way, the probe tip is substantially orthogonal to the plane of a sample holder 67 supporting a sample 64 having a surface 65 to be imaged. This is typically accomplished with an appropriately machined probe holder that can then be mounted in the AFM head. The drawbacks of this arrangement have been discussed previously, including XY positional variation of the probe that directly effects the tip's Z position when employing an angled mount.

Figure 3:
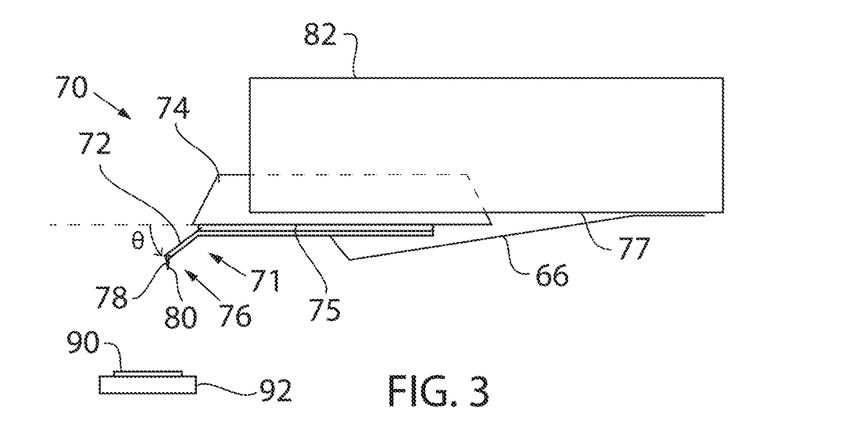
FIG. 3 is a schematic side elevational view of a probe mounted in an AFM head and fabricated according to a preferred embodiment with a cantilever extending from the base of the probe with a known angle to accommodate orthogonally positioning the probe tip relative to the sample.

Turning to FIG. 3, a probe device 70 including probe 71 having a cantilever 72 extending from a base 74 of device 70 formed from a substrate (e.g., photolithographically patterned on a silicon wafer) includes a free end 76 supporting a tip 78. Tip 78 of probe device 70 includes a distal end 80 (i.e., apex) that may have a hemispherical shape of varying radii, and a conical or pyramidal shaped base or body. Notably, unlike the cantilever of probe 56 of probe device 50 of the prior art (FIG. 2), which extends linearly from its interface with the base to its distal end supporting its tip 62, cantilever 72 extends from base 74 at a set angle, θ. The fabrication of probe device 70 with built-in angle, θ, is discussed further below. The operational difference is illustrated by considering FIGS. 2 and 3 together.

With the known probe 56 in FIG. 2, the AFM head or the probe holder 52 must be configured with an angle β so that when probe device 50 is mounted in the head, the laser deflected off the backside of the cantilever is directed to the sensor of the optical deflection detection arrangement. In this design, tip 62 extends substantially orthogonally to the sample surface 65 as the two are brought in to contact. A spring-loaded clip 66 holds probe device 50 in a probe holder 52 so that this relationship between probe tip 62 and sample 64 is maintained. In the preferred embodiments, in contrast, the AFM head/probe holder 82 does not have to be configured with an angle to allow this orthogonal relationship between tip 78 and a sample 90 supported by a sample holder 92. In this case, the angle between a bottom surface 77 of probe holder 82 and a bottom surface 75 of base 74 of probe device 70 is zero (β=0°), and the probe device 70 itself is designed with the requisite angle (θ) to accommodate the deflection detection apparatus. Notably, angle, θ, may need to be different for different probe designs and different samples to maintain the orthogonal tip-sample relationship and accommodate the optical deflection detection scheme. Incorporating the angle in the probe design lends flexibility to the instrument design. To wit, when the probe is fabricated with a built-in angle, a single AFM head/probe holder design 82 can be used across varying applications with different types of probes and samples to be imaged.

Figure 4:
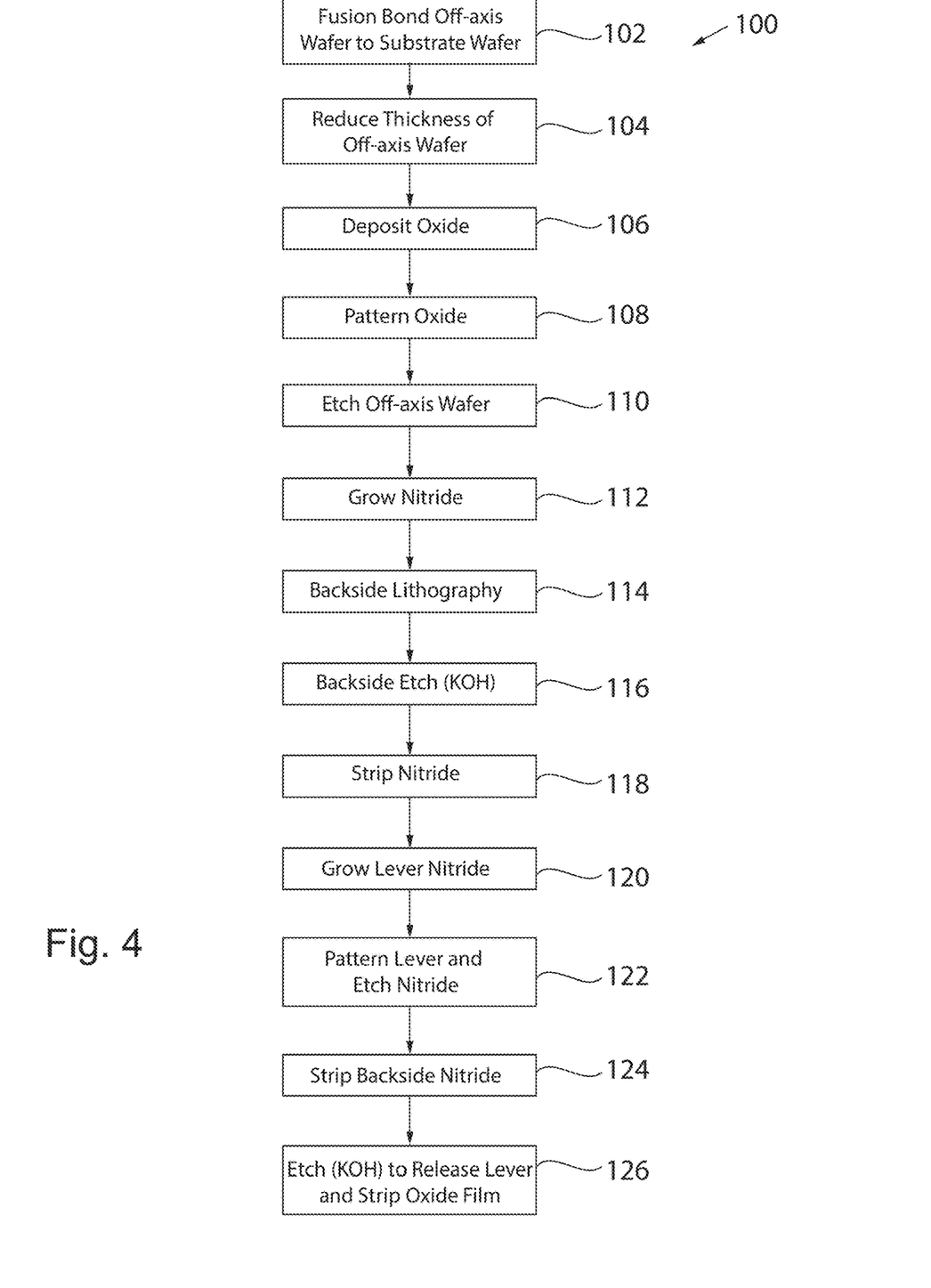
FIG. 4 is a flow chart illustrating a method of fabricating a probe with an angled cantilever such as that shown in FIG. 3.
Figure 5A:
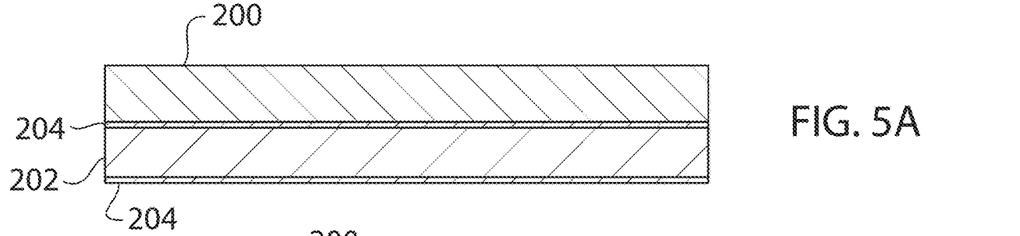
FIGS. 5A-5L are schematic side elevational views of an AFM probe being microfabricated according to the method of FIG. 4 so as to have a cantilever angled relative to the probe base, according to a preferred embodiment.
Figure 5B:
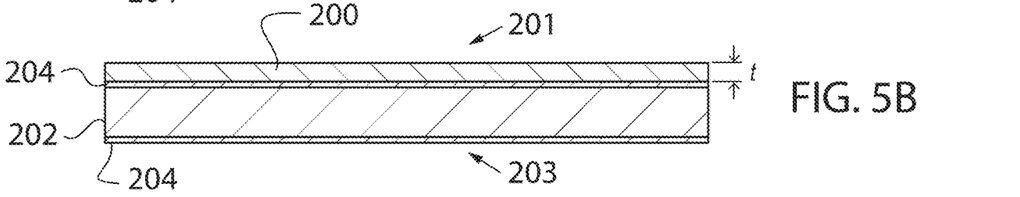

The microfabrication process for making probes with this built-in angle is set forth in the flow diagram of FIG. 4, and will be described together with an illustration of each step of the probe being fabricated in FIGS. 5A-5L. In FIG. 4, a method 100 of fabricating AFM probes having a built-in angle is shown in FIG. 4. Initially, in Step 102, an off-axis wafer 200 with a bare surface is, preferably, thermal fusion bonded to a substrate wafer 202 (e.g., standard <100> orientation silicon wafer having an oxidized surface), leaving an oxide layer 204 between the two (FIG. 5A). It is the crystalline structure of the off-axis wafer that ultimately produces the angle of the cantilever of the probe, as described further below. The off-axis wafer can be defined by a: <111> orientation processed 0 degrees towards the <100> crystal direction. The bonded wafers shown in FIG. 5A have a front side 201 and a back side 203. Next, method 100 includes reducing the thickness of the off-axis wafer 200 in Step 104 leaving a thickness, t, of wafer 200 (FIG. 5B), typically by grinding and/or polishing. This thickness, t, is in the range of about 20-40 microns, and preferably about 30 microns, and contributes to the length of the cantilever of the probe, as shown and described further below.

Figure 5C:
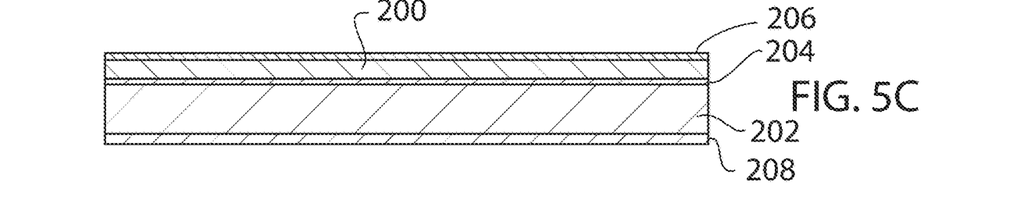

Method 100 then includes, in Step 106, growing an oxide layer as shown in FIG. 5C, leaving a layer 206 on the front side 201, and a thicker layer of oxide 208 on the backside 203 (thicker because of the oxidized surface of the standard wafer).

Figure 5D:
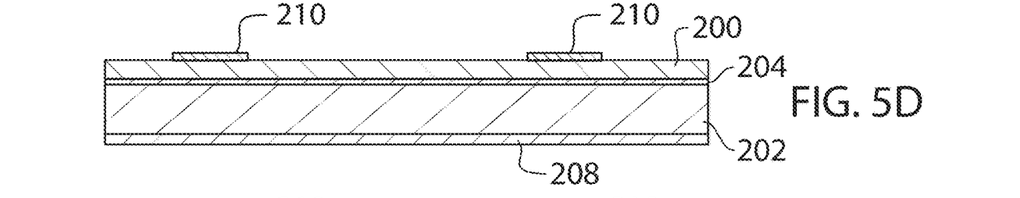

In Step 108, the front side oxide layer 206 is patterned using standard photolithography techniques including a masking film, thereby leaving portions of oxide 210 of oxide layer 206 as shown in FIG. 5D.

Figure 5E:
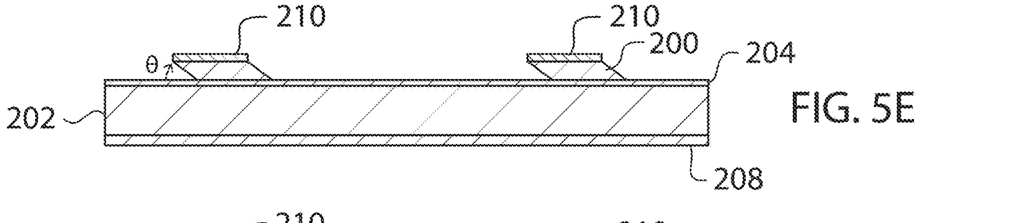
Figure 5F:
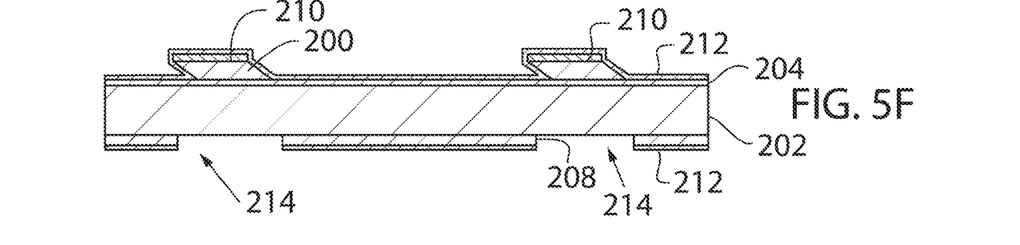
Figure 5G:
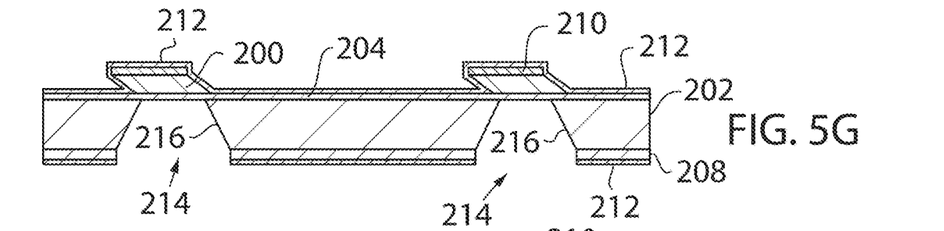

Turning to FIG. 5E, an etch of the off-axis wafer is performed in Step 110. The time and material of the etch is controlled to produce the desired lever angle. Preferably a KOH etch is employed. More particularly, the parameters of an anisotropic KOH etch are controlled to etch along the crystalline plane of the off-axis wafer to produce angle, θ. Typical ranges for angle, θ, are 8°-15°, and more preferably, 10-12° or 11-13°, with about 12° being preferred.

Next, in Step 112, silicon nitride $Si_3N_4$ is grown on the bonded wafer as a layer 212 (FIG. 5F), and then an appropriate mask is deposited and the nitride is patterned as shown. This backside lithography step, Step 114, will ultimately define each base of the field of probe devices being fabricated. The backside patterned nitride exposes wafer 202 at strategic locations 214 (FIG. 5F) relative to the frontside lithography that creates angle θ (FIG. 5E). In that regard, a backside etch (preferably, KOH) is performed in Step 116 (creating angled surfaces 216 of the probe device base, see FIG. 5G). The exposed surface locations 214 of the standard wafer are strategically placed so when the backside KOH step is performed the point the levers begin to angle is near the edge of the base (discussed and shown below).

Figure 5H:
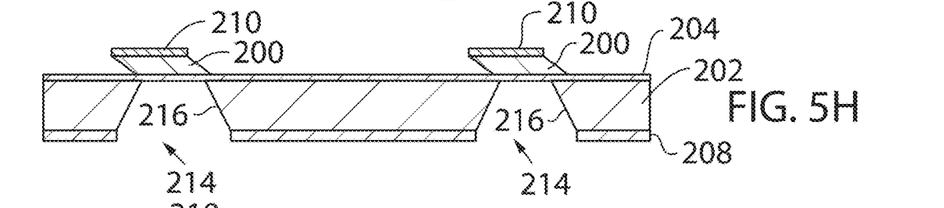
Figure 5I:
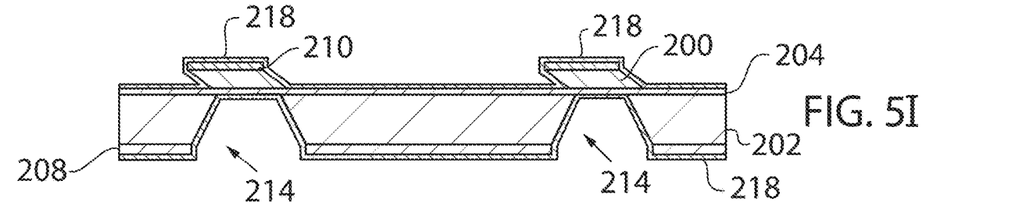
Figure 5J:
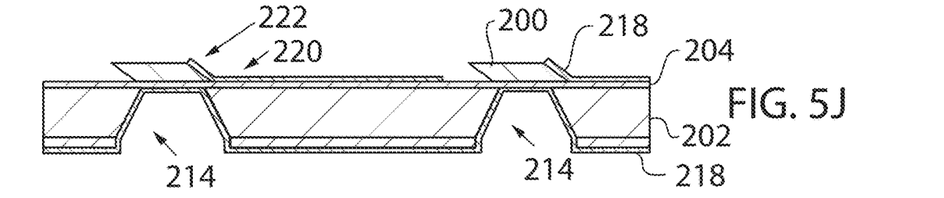
Figure 5K:
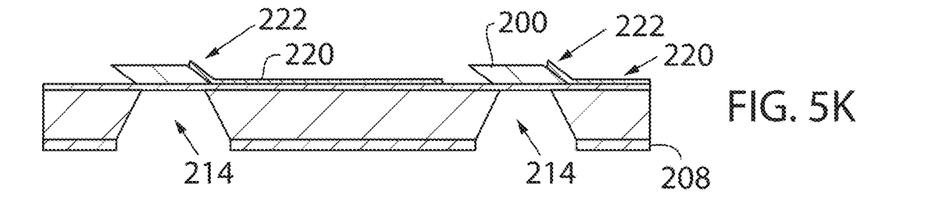
Figure 5L:
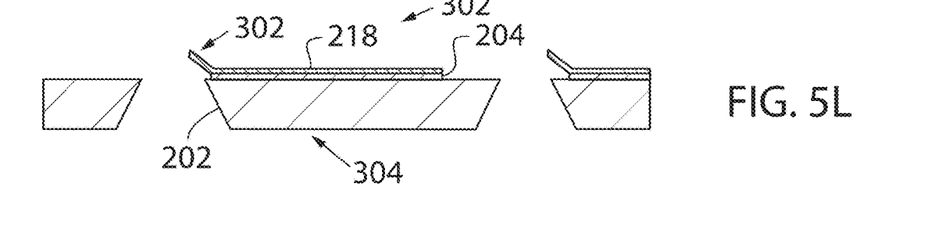

The nitride is then stripped in Step 118 (FIG. 5H). The cantilever material is then grown, e.g., silicon nitride of a selected thickness (218 in FIG. 5I), in Step 120. Front side and back side surfaces include a silicon nitride layer as shown in FIG. 5I. Another photolithography step is used to pattern the field of levers on the front side of the bonded wafer in Step 122. As shown in FIG. 5J, the levers include a portion 220 of nitride 218 that extends along the surface of the substrate and a portion 222 that is angled and will be the operational portion of the cantilever. Next, a backside strip of the nitride is performed in Step 124 (FIG. 5K). Lastly, another KOH etch is performed in Step 126 to release the probes from the substrate and the oxide is stripped from the wafer. As a result, method 100 yields a plurality of probe assemblies 300 having cantilevers 302 extending from respective bases 304, as shown in FIG. 5L.

Figure 6:
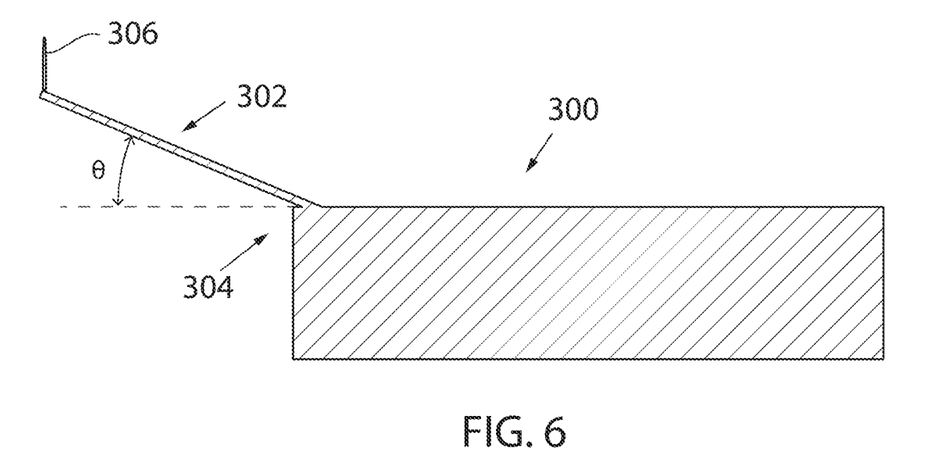
FIG. 6 is a schematic side elevational view of a probe fabricated according to the method shown in FIGS. 4 and 5A-5L.
Figure 7:
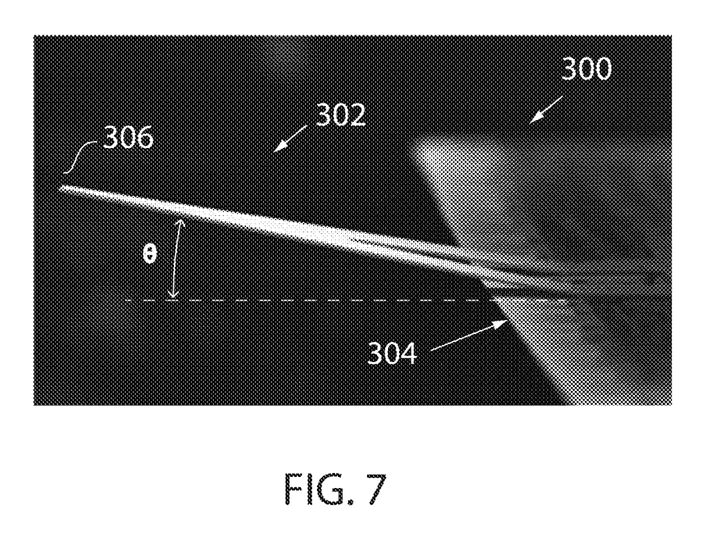
FIG. 7 is an image of a probe fabricated according to the method shown in FIGS. 4 and 5A-5L, according to a preferred embodiment.

FIGS. 6 and 7 more specifically show the resultant product using method 100 of FIGS. 4 and 5. In the schematic illustration of FIG. 6, probe device 300 includes a cantilever 302 extending from a base 304. Lever 302 forms an angle θ to base 304 that again is preferably about 12°. At a distal end of lever a tip 306 is supported. Tip 306 may be glued (DLC tips) or formed using known techniques such as electron beam deposition (EBD SEM and can be oriented at any angle relative to the base. Overall, tight control of the location of the tip relative to the free end of the cantilever is realized with the preferred embodiments. An image of a resultant probe assembly is shown in FIG. 7. By forming the probe devices in this fashion, with cantilevers 302 having a built-in angle, θ, access to the laser beam reflected off the backside of the cantilever is provided without having to angle the AFM head or probe holder. Moreover, tip 306 will extend substantially orthogonally to the sample surface when the two are introduced. Without requiring that the AFM instrument provide the angle to accommodate the optical deflection detection apparatus, and achieve this substantially orthogonal relationship, AFM performance is improved. For example, the user benefits from better mass balance between mount and probe, leading to improved imaging in certain types of applications, such as in Peak Force Tapping (PFT) mode of AFM imaging.

Also, the user experience is very repeatable and consistent from probe to probe when batch fabricated as described herein. Moreover, any XY positional variation of the probe that may directly affect the tip's Z position with an angled mount is minimized. Transferring the angle from the mount to the built-in angle of the cantilever negates any Z effects due to XY probe positioning on the mount. An additional benefit of transferring the angle from the mount to the built-in angle cantilever is distributing most of the mass of the cantilever in a plane orthogonal to Z motion. In so doing, the dynamic stability of the scanning assembly can be improved, through the reduction of induced parasitic motions related to the tilting of the tip mass in the Z direction from an angled tip mount. In sum, application of the preferred probe design and fabrication techniques encompasses a broad spectrum of already existing AFMs, probes and their associated applications. Moreover, the tips on these angled cantilevers are typically diamond-like carbon, and therefore, the lifetime of the probe devices is enhanced.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A method of batch-fabricating an array of probe devices for a surface analysis instrument, the method including:
   providing a wafer;
   photolithographically forming a base and a cantilever for each probe device;
   wherein the cantilever includes a built-in angle, $\theta$, relative to the base; and
   wherein the providing step includes bonding an off-axis wafer (111) with a substrate wafer.

2. The method of claim 1, wherein the base is substantially parallel to a sample holder when the probe is mounted in a probe holder of the surface analysis instrument.

3. The method of claim 1, further comprising reducing the thickness of the off-axis wafer by at least one of grinding and polishing.

4. The method of claim 3, further comprising growing an oxide on the wafer and patterning the array.

5. The method of claim 4, further comprising etching the off-axis wafer to leave a portion of the off-axis wafer having an angled surface relative to the substrate wafer for each probe, and wherein the angle, $\theta$, is 8°-15°.

6. The method of claim 5, wherein the etching step uses a KOH etch for a selected amount of time.

7. The method of claim 6, further comprising:
   depositing a silicon nitride layer on the wafer;
   photolithographically patterning the backside of the wafer; and
   etching the backside of the wafer with a KOH etch to release the backside, and stripping the silicon nitride layer.

8. The method of claim 7, further comprising depositing a second layer of silicon nitride on the wafer, and then patterning the cantilevers of the probe devices.

9. The method of claim 1, wherein the substrate is a silicon wafer with an oxidized surface.

10. A probe device for a surface analysis instrument including a probe holder, the probe device comprising:
    a base;
    a cantilever;
    wherein the probe device includes an off-axis wafer (111) bonded with a substrate wafer and is mounted in the surface analysis instrument at an angle, $\beta$, between the base and a surface of the probe holder of the surface analysis instrument that is substantially parallel to a mounting surface of a sample holder of the surface analysis instrument, and wherein $\beta$ is 0°.

11. The probe device of claim 10, further comprising:
    a tip; and
    wherein the cantilever extends from the base at an angle, $\theta$, thereto, so that when introduced to a sample, the tip extends in a direction substantially orthogonal to a surface of the sample.

12. The probe device of claim 11, wherein the angle, $\theta$, is 8°-15°.

13. The probe device of claim 12, wherein the angle, $\theta$, is about 12°.

14. The probe device of claim 10, wherein the cantilever is made of silicon nitride ($Si_3N_4$).

15. The probe device of claim 11, wherein the tip is a diamond-like carbon (DLC) tip.

16. The probe device of claim 10, wherein the surface analysis instrument is an AFM.

17. An AFM probe device microfabricated by a process comprising the steps of:
    providing a wafer;
    photolithographically forming a base and a cantilever for each probe device;
    wherein the cantilever includes a built-in angle, $\theta$, relative to the base; and
    wherein the providing step includes bonding an off-axis wafer (111) with a substrate wafer.

18. The probe device of claim 17, wherein the base is substantially parallel to a sample holder when the probe device is mounted in a probe holder of the AFM, and wherein the angle, $\theta$, is 8°-15°.

* * * * *